Jan. 22, 1946. T. W. STEDMAN 2,393,496
REINFORCED TUBING
Filed Sept. 24, 1942
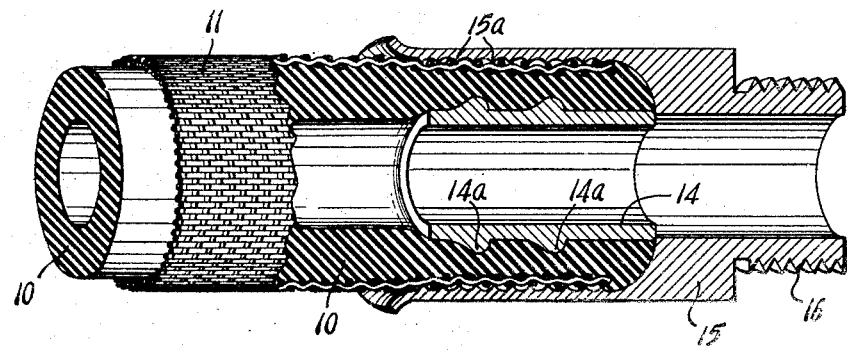
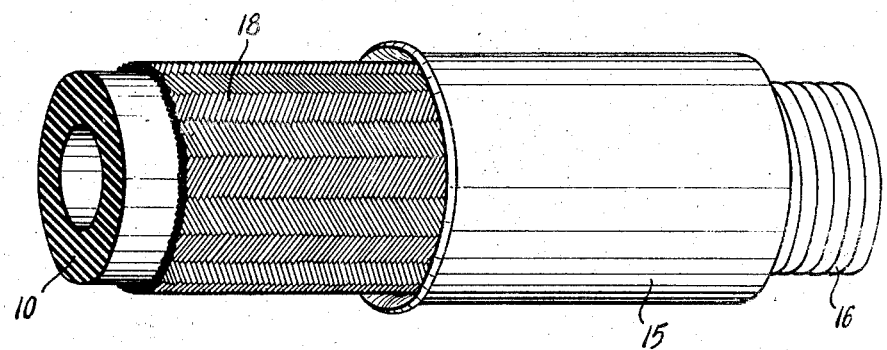
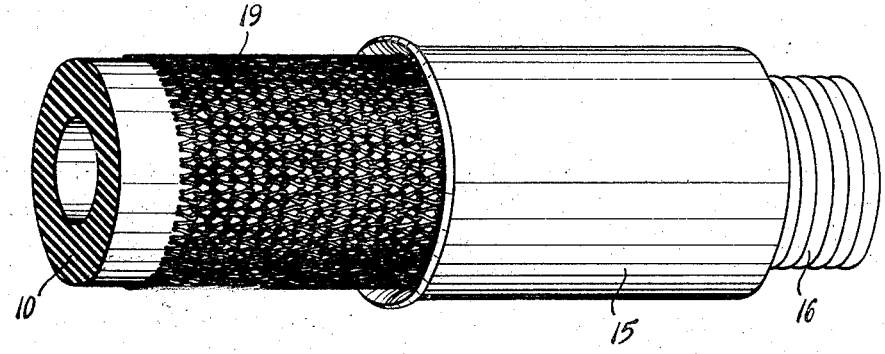
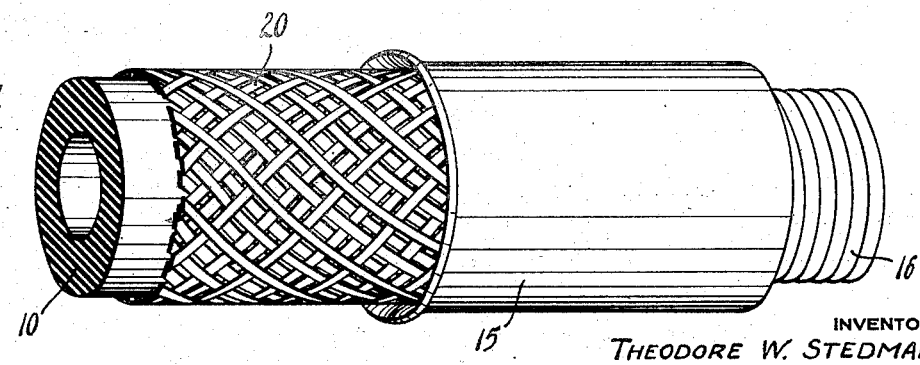
INVENTOR
THEODORE W. STEDMAN
BY
Ely & Frye
ATTORNEYS Patented Jan. 22, 1946

2,393,496

UNITED STATES PATENT OFFICE 2,393,496

REINFORCED TUBING

Theodore W. Stedman, New York, N. Y., assignor to The Firestone Tire & Rubber Company, Akron, Ohio, a corporation of Ohio Application September 24, 1942, Serial No. 459,505

3 Claims. (Cl. 138—56)

This invention relates to tubing or hose, such as flexible tubing or hose for the conducting of fluids, and more especially it relates to tubing of the character mentioned that is provided with external reinforcement or armor.

An illustrative example of a situation wherein the improved tubing is advantageously employed is the gasoline dispensing hoses of automobile service stations. Such hoses are extensively flexed during use, they are exposed to the elements, and to the heat and cold of different seasons. Furthermore, such hoses are subject to abrasion, and frequently come into contact with oil, grease, gasoline, and other products supplied by said stations. The tubing of the invention also may be usefully employed for electrical conduits, and for the braking systems of automotive and other vehicles wherein the hoses employed are subject to high internal pressures as well as to other rigorous service conditions. The improved tubing has many other useful applications in domestic and industrial arts as readily will be apparent to those skilled in the art.

The chief objects of the invention are to provide reinforced tubing or hose whereof the reinforcing structure is inherently flexible; is non-inflammable; is abrasion resisting; is substantially chemically inert; and which has relatively high tensile strength. Further objects are to provide a tube-reinforcing structure that is light in weight; that is sufficiently resistant to heat so as not to soften under usual service conditions; that is but slightly affected by sunlight; that has but slight tendency to cold flow; which is highly resistant to organic solvents; and that is fabricated from smooth plastic strands, strips or filaments which will slide over one another without nicking. Another object is to provide tubing or hose comprising an armoring sheath of fabric having the aforementioned physical and chemical characteristics. Other objects will be manifest as the description proceeds.

Of the accompanying drawing:

Fig. 1 is a sectional perspective view of an end portion of a reinforced hose constituting one embodiment of the invention, and a coupling fixture mounted thereon;

Fig. 2 is a perspective view of an end portion of another embodiment of the invention, and a coupling fixture thereon; and Fig. 3 and Fig. 4 are views similar to Fig. 2 of two other embodiments of the invention.

Referring to Figure 1 of the drawing, there is shown a reinforced hose or tube structure comprising an inner tube body 10 of dense, flexible, resilient, elastic composition, and a fabric sheath or jacket 11 mounted upon the exterior thereof. The tube body 10 usually is composed of high grade vulcanized rubber composition, which is suitably compounded to give optimum results in the situation for which the hose is designed. The invention is not limited, however, to the use of rubber in the tube body 10, and where the tubing is to be employed in contact with hydrocarbons or other chemical constituents that detrimentally affect rubber, suitable synthetic rubber or rubber-like composition, such as "Buna" (a butadiene copolymer), "Thiokol" (a polyalkylene sulfide) or neoprene (a polychloroprene) may be employed in place of rubber as the resilient or elastic composition.

The fabric sheath or jacket 11 is a seamless, circular, square-woven structure that extends from one end of the tube body 10 to the other. As shown in Fig. 1, the sheath 11 is composed of a multiplicity of longitudinally extending warp strands or filaments, and a single weft strand that extends helically of the sheath and is interwoven with said warp strands. The said strands or filaments preferably are about 17 to 20 mils diameter, and are closely woven so as to provide a jacket of fine mesh. Since only one weft strand is employed, the pitch thereof is extremely low with the result that there is little or no tendency of the hose to twist when subjected to internal pressure. When the tube body 10 has a thick wall and is relatively stiff, the jacket may be woven directly upon it. If the tube body has a thin wall and is flexible, it is preferable that the jacket 11 be separately woven, and of slightly smaller inside diameter than the outside diameter of the tube body 10. The latter may then be collapsed and drawn into the tubular jacket, and thereafter expanded so as to become firmly attached to the jacket.

A distinguishing characteristic of the invention is the composition of the strands or filaments that make up the sheath or jacket 11, said filaments being composed of materials known as "plastics," and being mono-filaments. The class of materials employed in the manufacture of the novel sheaths described herein are polymeric or co-polymeric resins in combination with suitable plasticizers and stabilizers, with which may be incorporated suitable coloring pigments, dyes, or other coloring material, if desired. In its specific aspects, the material preferably employed in the manufacture of the improved tubing sheath is the group derived from the polymerization of vinylidene chloride either alone or conjointly with one or more compounds selected from the group which consists of the vinyl halides (of which vinyl chloride is typical), the lower aliphatic esters of vinyl alcohol (of which vinyl acetate is typical), the lower aliphatic esters of methacrylic and acrylic acids (of which methyl methacrylate and ethyl acrylate are typical), and styrene together with its nuclear substituted chlorine derivatives (of which styrene and meta chlorstyrene are typical). The vinylidine chloride composition per se constitutes the subject matter of U. S. Patent to R. M. Wiley, No. 2,233,442, issued March 4, 1941.

The composition is thermo-plastic, but at substantially elevated temperature, and when in fluent condition it may be extruded into mono-filaments of the shape and length desired. To make the material more readily extrudable and ductile, however, suitable plasticizers and/or stabilizers are preferably added, as is well known in the art of vinylidene chloride plastics. The material is then extruded through a die to the desired cross-sectional contour, and is then drawn by elongating the strip or strand, while still in a plastic state, to reduce the cross-sectional dimension of the strand to the desired size.

As distinguished from other common plastics, vinylidene chloride plastics possess a substantial degree of fibrous crystallinity. Normally, these fibrous crystals lie in a random, heterogeneous arrangement, in which condition the plastic is found to have physical properties in the ordinary range of other thermoplastic materials known in the prior art. Partially by extrusion, and more completely by the drawing operation, the fibrous crystals are re-aligned or oriented in an orderly linear pattern. When such an extruded, oriented plastic strand is stressed, each crystal theoretically assumes its share of the load and the more desirable physical properties enumerated in the objects above are attained.

An important characteristic of the plastic strand or filament thus manufactured is that its desirable qualities, particularly its pliability, are unaffected by all ordinary atmospheric temperature changes. The filament has a tensile strength as high as 60,000 lbs. per sq. in., a high flexural strength of 15,000 to 17,000 lbs. per sq. in., a high impact strength, and a high resistance to heat. It is very tough, being resistant to cutting or slitting, as with a knife, and free from grain structure and from splitting. The material becomes stronger with age, and is non-inflammable, non-water absorptive, and unaffected by acids, alkalies or ordinary organic solvents such as gasoline, benzene, naphthas, alcohols and the like. The filaments may also be colored as desired, suitably by incorporating a pigment of the desired color in the plastic before it is extruded.

After being cooled, the extruded and oriented filaments may be utilized in the production of the tubular sleeve or jacket 11 by weaving the filaments in the manner described hereinabove.

The improved reinforced hose described is completed by the application of coupling fixtures to the respective ends thereof. Each of said coupling fixtures comprises a tubular insert or nipple 14 having an outside diameter slightly larger than the inside diameter of the tube body 10, and formed with external circumferential flanges or ribs 14a, 14a, said insert or nipple being forced into the tube body, at the end thereof, to reinforce the tube body and slightly to distend the same. Externally applied to each hose-end, and over the end portion of the jacket 11 thereon, is a sleeve-like fixture 15, the portion thereof that fits over the said jacket being relatively thin and initially of greater inside diameter than the outside of the latter, and being interiorly formed with a series of circumferentially extending ridges or ribs 15a, 15a. The outer end portion of the coupling 15 is of reduced diameter, and is formed, as shown in the drawing, with male screw threads 16, although it will be understood that a female threaded element may be employed if desired. After the coupling fixture 15 is applied to the hose-end as described, the internally ribbed portion thereof is then constricted or spun down to smaller diameter, with the result that the ribs 15a are pressed into the hose structure 10 and jacket 11 thereon. The arrangement is such as to anchor the ends of the fabric jacket 11 to the hose structure 10, and to prevent accidental removal of the coupling fixtures.

The invention provides a superior reinforced hose or tube that is lighter in weight than similar structures employing metal reinforcement, that is inherently flexible, that is strong and durable, and which achieves the other advantages set out in the foregoing statement of objects.

The embodiments of the invention shown in Figs. 2, 3 and 4 are identical with that shown in Fig. 1 in all respects except the construction of the plastic fabric reinforcing jacket or sleeve thereon. In Figure 2 the jacket, which is designated as a whole by the numeral 18, is composed of mono-filaments that are braided into a continuous circular sleeve. As shown, these filaments are essentially similar to the filaments of the jacket 11, but they may differ therefrom in size and shape if desired. In Figure 3 the circular jacket, which is designated 19 is knitted from mono-filaments. Obviously a jacket of this construction will not prevent substantial distension of the tubing and therefore will not be used in situations where the tubing is subjected to high internal pressure.

In Fig. 4 the circular jacket is designated 20 and is composed of mono-filaments that are in the form of tapes, that is, that are relatively wide as compared to their thickness. The said tapes are wrapped about the hose-structure 10 in groups, all of which are disposed approximately at an angle of 45 degrees to any longitudinal surface line, some of the filaments being laid in one direction so as to intersect the first mentioned filaments substantially at an angle of 90 degrees.

An inherent feature of the tube reinforcing jacket of the invention is the fact that the extruded plastic strands, strips or filaments which make up the jacket are so smooth that they will slide over one another without nicking. This characteristic is important whenever the application of a high pressure within the tube causes the same to distend strongly against the jacket. When such condition arises, the smooth plastic strands of the jacket readily slide over one another without any nicking of the strands occurring, so as to allow the applied stresses to be uniformly distributed throughout the jacket. The tubular reinforcing jacket is, therefore, expansible and contractible, and is adapted to fit snugly around the enclosed elastic resilient tube at all times.

Reference is made to the applicant's copending Patent No. 2,354,436, which discloses that the applicant manufactured durable and flexible vinylidene chloride monofilament fabrics at an early date.

Other modification may be resorted to without departing from the spirit of the invention, or the scope thereof as defined by the appended claims.

What is claimed is:

1. Reinforced tubing comprising an inner flexible tubular structure of rubber or rubber-like composition, and an outer continuous circular fabric sheath mounted thereon, said sheath composed of mono-filaments consisting essentially of a vinylidene chloride copolymer and a plasticizer, the filaments having an oriented crystalline structure.

2. Reinforced tubing comprising an inner flexible tubular structure of rubber or rubber-like composition and an outer continuous circular fabric sheath composed of mono-filaments interwoven so as to form a protective jacket of fine mesh, said filaments consisting essentially of vinylidene chloride copolymer having an oriented crystalline structure, said filaments being physically unattached to said inner tubular structure and to each other to provide relative movement therebetween.

3. Reinforced tubing comprising an inner flexible tubular structure of rubber or rubber-like composition and an outer continuous circular fabric sheath composed of mono-filaments interwoven so as to permit expansion, contraction and flexing of said reinforced tubing, said filaments composed of polymerized vinylidene chloride composition having an oriented crystalline structure, said filaments being physically unattached to said inner tubular structure and to each other to provide relative movement therebetween.

THEODORE W. STEDMAN.